(12) United States Patent
Motokawa et al.

(10) Patent No.: US 9,564,619 B2
(45) Date of Patent: Feb. 7, 2017

(54) BATTERY MODULE WHICH REDUCES NOISE ON A SIGNAL LINE

(75) Inventors: Shinya Motokawa, Osaka (JP); Shunsuke Yasui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 855 days.

(21) Appl. No.: 13/514,542

(22) PCT Filed: Nov. 17, 2011

(86) PCT No.: PCT/JP2011/006411
§ 371 (c)(1),
(2), (4) Date: Jun. 7, 2012

(87) PCT Pub. No.: WO2012/073440
PCT Pub. Date: Jun. 7, 2012

(65) Prior Publication Data
US 2012/0244401 A1   Sep. 27, 2012

(30) Foreign Application Priority Data
Nov. 30, 2010   (JP) .................. 2010-266777

(51) Int. Cl.
*H01M 10/48*   (2006.01)
*H01M 10/42*   (2006.01)
(Continued)

(52) U.S. Cl.
CPC .......... *H01M 2/1016* (2013.01); *H01M 2/202* (2013.01); *H01M 10/425* (2013.01);
(Continued)

(58) Field of Classification Search
CPC ..... H01M 2/105; H01M 10/48; H01M 10/482
See application file for complete search history.

(56) References Cited

U.S. PATENT DOCUMENTS 4,407,911 A * 10/1983 Hooke ................. H01M 2/105
429/159
5,912,597 A   6/1999 Inagawa et al.
(Continued)

FOREIGN PATENT DOCUMENTS

JP   07-321429   12/1995
JP   11-120976   4/1999
(Continued)

OTHER PUBLICATIONS

International Search Report issued in International Patent Application No. PCT/JP2011/006411, filed on Nov. 17, 2011.

*Primary Examiner* — Maria J Laios
*Assistant Examiner* — Robert S Carrico
(74) *Attorney, Agent, or Firm* — McDermott Will & Emery LLP

(57) ABSTRACT

A battery module is provided in which a signal line is prevented from the influence of noise caused by an internal current output line.

A battery module includes: a plurality of cells 100; a current conduction member 34 electrically connecting electrode terminals of the plurality of cells; and a signal line 50 configured to measure capacitance of the plurality of cells, wherein the current conduction member includes a parallel section including two members which are opposite in direction of a current flowing therethrough and are arranged substantially parallel to each other, and a connection section electrically connecting the two members at one end of the parallel section, and the signal line is arranged nearly equidistant from the two members, and extends substantially parallel to the two members to approach the connection section.

3 Claims, 6 Drawing Sheets

(51) Int. Cl.
*H01M 2/10* (2006.01)
*H01M 2/20* (2006.01)
H01M 10/6555 (2014.01)
H01M 10/613 (2014.01)

(52) U.S. Cl.
CPC ........ H01M 10/482 (2013.01); *H01M 10/613* (2015.04); *H01M 10/6555* (2015.04)

(56) References Cited

U.S. PATENT DOCUMENTS

2003/0134189 A1* 7/2003 Kanai et al. .................. 429/156
2008/0286636 A1* 11/2008 Naito et al. ..................... 429/98
2009/0258282 A1 10/2009 Harada et al.
2010/0047676 A1* 2/2010 Park ..................... H01M 2/105
429/93

FOREIGN PATENT DOCUMENTS

| JP | 2007220613 A | * 8/2007 | ............. H01M 2/10 |
|----|--------------|----------|------------------------|
| JP | 2009-059663 | 3/2009 | |
| JP | 2009-252460 | 10/2009 | |
| JP | 2009-289428 | 12/2009 | |

* cited by examiner

BATTERY MODULE WHICH REDUCES NOISE ON A SIGNAL LINE

RELATED APPLICATIONS

This application is the U.S. National Phase under 35 U.S.C. §371 of International Application No. PCT/JP2011/006411, filed on Nov. 17, 2011, which in turn claims the benefit of Japanese Application No. 2010-266777, filed on Nov. 30, 2010, the disclosures of which Applications are incorporated by reference herein.

TECHNICAL FIELD

The present invention relates to battery modules.

BACKGROUND ART

Battery modules including a plurality of cells accommodated in a case to be capable of outputting a predetermined voltage and capacitance are widely used as power supplies of various devices, vehicles, etc. and household power supplies. Specifically, the technique of forming blocks by connecting general-purpose secondary batteries in parallel and/or in series to be capable of outputting a predetermined voltage and capacitance and being charged, and combining the battery blocks in many ways to be applicable to various applications is beginning to be used. In the block formation technique, the performance of the batteries accommodated in the battery blocks is enhanced to reduce the size and the weight of the battery blocks themselves. Thus, the block formation technique has various advantages such as improvement of workability in assembling battery modules, and improvement of flexibility in mounting the battery modules in areas of limited space, such as a vehicle.

It is required for the cells included in the battery modules as described above to have substantially the same capacitance (dischargeable electric capacitance at a certain point in time). This is because if the cells exhibit variations in capacitance, certain cells are subjected to a high charge/discharge load compared to the other cells, so that the certain cells degrade earlier, which results in reduced life of the battery modules themselves.

CITATION LIST

Patent Document

Patent Document 1: Japanese Patent Publication No. H07-321429

SUMMARY OF THE INVENTION

Technical Problem

Prevention of the above-described variations in capacitance of the cells has not been particularly studied. In particular, when total power supply capacitance is very large, such as the case of power supplies of electric vehicles, combining a large number of cells with each other to form a battery module has been considered, but a specific method for preventing the variations in capacitance of the cells is currently under study.

In one of such studies, it is considered to monitor the capacitance of the cells. In order to monitor the capacitance of the cells, a signal line for the monitoring has to be provided in the battery module.

However, inventors of the present application found a publicly unknown problem where a current output line is disposed in the battery module, noise caused by the current output line through which a large current flows may influence the signal line, and erroneous operation may occur when the variations in capacitance of the cells are controlled based on a signal from the signal line.

In view of the foregoing, the present invention was devised. It is an objective of the present invention to provide a battery module in which a signal line is prevented from the influence of noise caused by a current output line in the battery module.

Solution to the Problem

A first battery module of the present invention includes: a plurality of cells; a current conduction member electrically connecting electrode terminals of the plurality of cells; and a signal line, wherein the current conduction member includes a parallel section including two members which are opposite in direction of a current flowing therethrough, and are arranged substantially parallel to each other, and a connection section electrically connecting the two members at one end of the parallel section, the signal line is arranged nearly equidistant from the two members, and is arranged substantially parallel to the two members, and one end of the signal line is arranged in a position away from the connection section in a direction toward the other end of the parallel section.

A second battery module of the present invention is a battery module including a plurality of cells which are columnar secondary batteries, and are accommodated in a metal case, the battery module including: a plurality of battery blocks connected to each other in series, wherein a first electrode terminal and a second electrode terminal are arranged respectively on an upper surface and a lower surface of each of the columnar cells, the battery blocks each include the plurality of cells connected to each other in parallel, where the cells are aligned with side surfaces of the cells being adjacent to each other to align the upper surfaces on a same side, and the battery blocks adjacent to each other are connected via a series connection member, the battery blocks each include a first connection member which is arranged to face the upper surfaces of the cells to electrically connect the first electrode terminals to each other, and a second connection member which is arranged to face the lower surfaces of the cells to electrically connect the second electrode terminals to each other, the plurality of battery blocks are grouped into two groups in each of which the battery blocks are arranged with the first connection members being aligned in a line, the groups are arranged to face each other, and are electrically connected to each other at ends of the two groups via a connection section on one side, a signal line is arranged nearly equidistant from the first connection members of the two groups facing each other, and one end of the signal line is arranged at a position away from the connection section in a direction toward ends of the first connection members on the other side.

In the above-described two configurations, the signal line does not cross a current output line of the battery module.

ADVANTAGES OF THE INVENTION

The signal line of the battery module is disposed between the two members included in the parallel section of the current conduction member, and does not cross the current output line, so that superimposition of noise on the signal line can be prevented.

DESCRIPTION OF EMBODIMENTS

Figure 1:
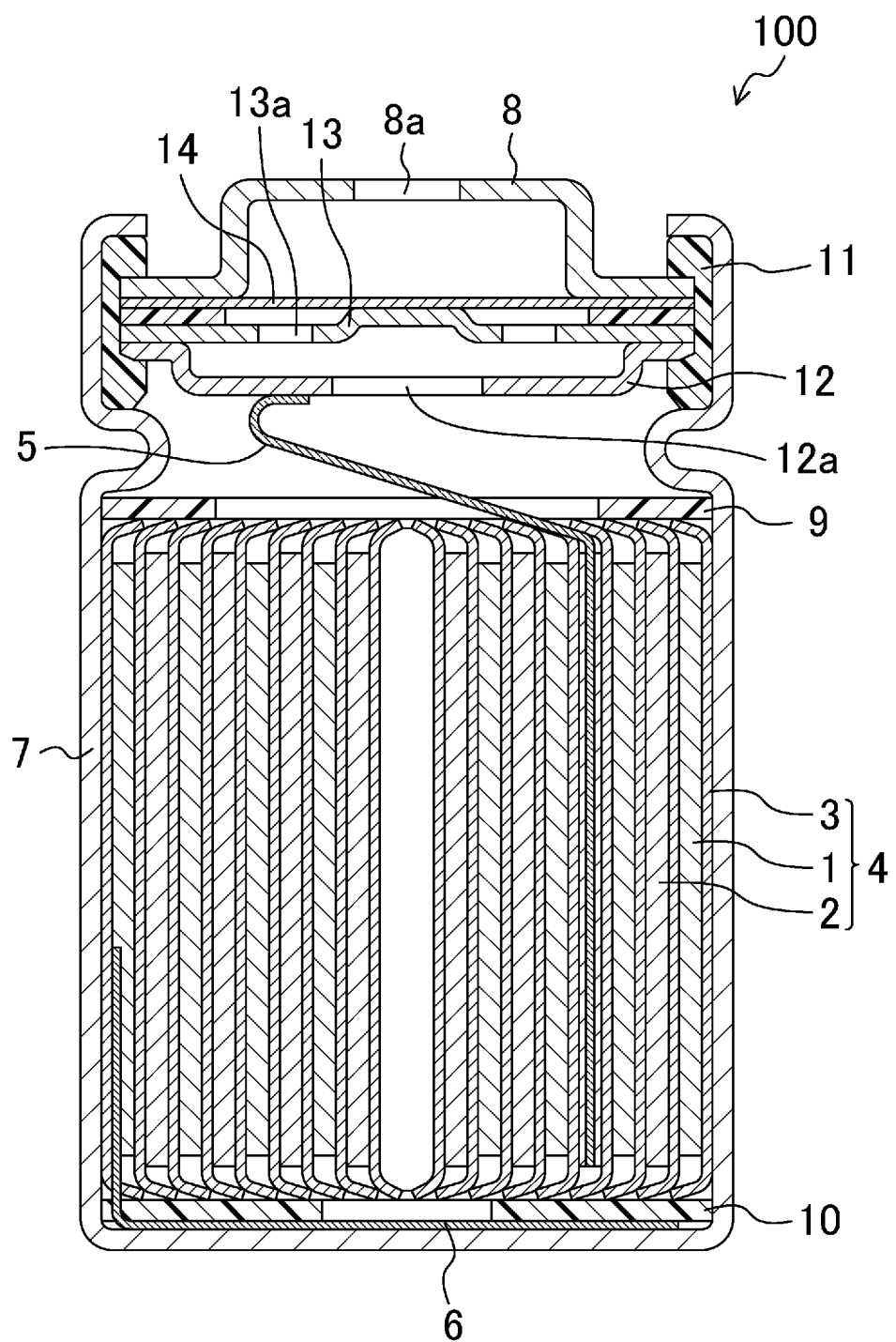
FIG. 1 is a cross-sectional view schematically illustrating a configuration of a cell used in a battery block of an embodiment.

Embodiments of the present invention will be described in detail below with reference to the drawings. In the drawings, like reference characters have been used to designate elements having substantially the same functions for the sake of brevity of description.

(First Embodiment)
<Cell>

FIG. 1 is a cross-sectional view schematically illustrating a configuration of a battery 100 used in a battery block of a first embodiment. Note that the battery used in the battery block of the present embodiment may be a battery which can also be used alone as a power supply of portable electronic devices such as lap top computers (hereinafter, batteries used in a battery block are referred to as "cells"). In this case, a high-performance general-purpose battery can be used as the cell in the battery block, and thus, performance enhancement and const reduction of the battery block can easily be made.

As the cell 100 used in the battery block of the present embodiment, for example, a lithium ion secondary battery in the shape of a cylindrical column as illustrated in FIG. 1 may be used. The lithium ion secondary battery has a general configuration, and includes a safety mechanism to release gas outside the battery when the pressure in the battery is increased due to the occurrence of an internal short-circuit, or the like. Note that the cell 100 is an example of batteries useable in the present embodiment, and thus is not intended to limit batteries useable in the present embodiment. For example, rectangular lithium ion secondary batteries may be used as the cells of the present embodiment. With reference to FIG. 1, a specific configuration of the cell 100 will be described below.

As illustrated in FIG. 1, an electrode group 4 formed by winding a positive electrode 2 and a negative electrode 1 with a separator 3 interposed between the positive electrode 2 and the negative electrode 1 is accommodated in a cell case 7 together with a nonaqueous electrolyte. Part of the cell case 7 in which the electrode group 4 including the positive electrode 2 and the negative electrode 1 serving as power-generating elements is accommodated can be referred to as a main body section of the cell. Insulating plates 9, 10 are disposed above and under the electrode group 4. The positive electrode 2 is joined to a filter 12 via a positive electrode lead 5, and the negative electrode 1 is joined to a bottom of the cell case 7 via a negative electrode lead 6, the bottom also serving as a negative electrode terminal (second electrode terminal).

The filter 12 is connected to an inner cap 13, and a raised section of the inner cap 13 is joined to a metal valve plate 14. Moreover, the valve plate 14 is connected to a terminal plate 8 also serving as a positive electrode terminal (first electrode terminal). The terminal plate 8, the valve plate 14, the inner cap 13, and the filter 12 together seal an opening of the cell case 7 via a gasket 11. In FIG. 1, the positive electrode terminal is arranged on an upper surface of the cylindrical column, and the negative electrode terminal serves as a lower surface of the cylindrical column.

When the pressure in the cell 100 is increased due to an internal short-circuit, or the like formed in the cell 100, the valve body 14 expands toward the terminal plate 8, and if the joint between the inner cap 13 and the valve body 14 is released, a current path is interrupted. When the pressure in the cell 100 further increases, the valve body 14 ruptures. Thus, gas generated in the cell 100 is released outside via a through hole 12a of the filter 12, a through hole 13a of the inner cap 13, the ruptured part of the valve body 14, and an opening portion 8a of the terminal plate 8.

Note that the safety mechanism to release the gas generated in the cell 100 to the outside is not limited to the structure illustrated in FIG. 1, and may have other structures.

<Battery Block>

Figure 2:
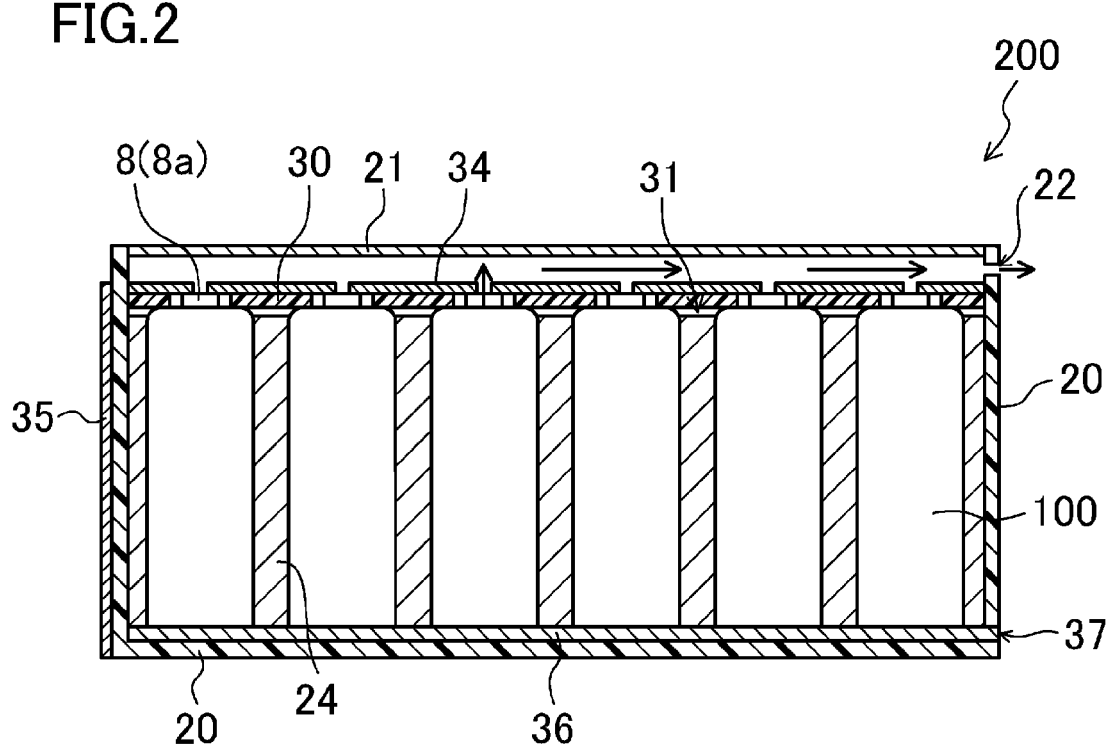
FIG. 2 is a cross-sectional view schematically illustrating a configuration of the battery block of the embodiment.

FIG. 2 is a cross-sectional view schematically illustrating a configuration of a battery block 200 of the present embodiment. In the present embodiment, the battery block 200 is minimum unit of a set including multiple ones of the cell 100, and the cells 100 in one battery block 200 are connected to each other in parallel.

In FIG. 2, a cross section of the plurality of cells 100 aligned and connected to each other in parallel is schematically illustrated (cross sections of the cells are not hatched for clarity), and the battery block 200 has a configuration in which the plurality of cells 100 are accommodated in a container 20.

The main body sections of the cells 100 are inserted into cylindrical through holes formed in a cooling block 24 accommodated in the container 20, and the cells 100 are aligned so that the main body sections of the cells 100 (side surfaces of the cylindrical columns) are adjacent to each other. Moreover, as illustrated in FIG. 1, each cell 100 includes the opening portion 8a through which the gas generated in the cell 100 is released to the outside. The cells 100 are aligned so that the opening portions 8a face the same direction (face upward in FIG. 2) in the battery block 200.

A first connection member 34 is made of a metal plate, and connects the positive electrode terminals of the cells 100 to each other. A second connection member 36 made of a metal plate is joined to the other terminals of the plurality of cells 100 (the negative electrode terminals in the present embodiment) exposed at lower openings of the through holes of the cooling block 24, and the negative electrode terminals are connected to each other via the second connection member 36. The first connection member 34 and the second connection member 36 are included in a current conduction member.

The first connection member 34 is electrically connected to a series connection member 35 disposed over an outer surface of a left side wall of the container 20. When multiple ones of the battery block 200 are aligned, the series connection member 35 is brought into contact with and is electrically connected to an end 37 of a second connection member 36 of an adjacent battery block 200, so that the battery blocks 200 adjacent to each other are electrically connected in series.

Note that a flat plate 30 is disposed in intimate contact with one end of each cell 100 (an end on a side closer to the positive electrode terminal 8 in the present embodiment), so that an accommodation section 31 is hermetically sealed with the flat plate 30.

<Battery Module>

Figure 3:
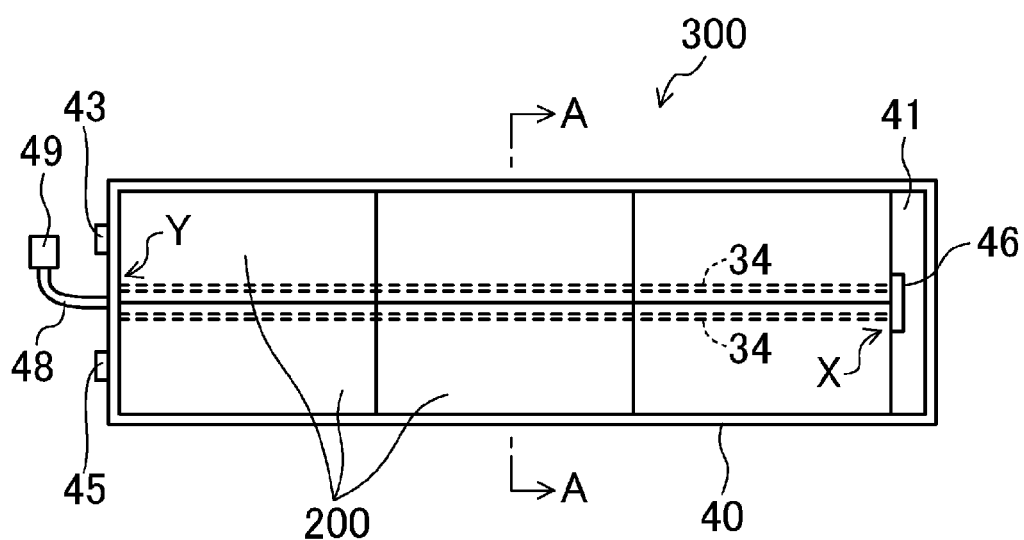
FIG. 3 is a view illustrating a configuration of a battery module of the embodiment.

FIG. 3 is a top view schematically illustrating a battery module 300 according to the present embodiment without an upper lid of a metal case 40. The battery module 300 includes an even number of battery blocks 200, 200, . . . (six battery blocks in the present embodiment) accommodated in the case 40. In the figure, two battery blocks 200 in the vertical direction form a pair, and three pairs are aligned in the horizontal direction. Therefore, the direction in which the three pairs are aligned, that is, the horizontal direction in the figure, is hereinafter referred to as a longitudinal direction of the battery module 300. In other words, three battery blocks 200, 200, 200 aligned in the longitudinal direction of the battery module 300 form a group, and two groups are aligned in parallel. Moreover, the battery module 300 itself is substantially a rectangular parallelepiped.

As illustrated in FIG. 3, the first connection members 34, 34, 34 of the three battery blocks 200, 200, 200 of the upper group and the first connection members 34, 34, 34 of the three battery blocks 200, 200, 200 of the lower group face each other, and extend parallel to the longitudinal direction of the battery module 300.

The first connection members 34, 34, 34 of these two groups form a parallel section of the current conduction member. Right ends of the first connection members 34, 34 (two members) of the pair of battery blocks 200, 200 on a rightmost side of the figure are electrically connected to each other via a connection section 46 disposed on the rightmost side. The pair of first connection members 34, 34 facing each other are arranged substantially in parallel to each other, and are opposite in direction of a current flowing therethrough.

Moreover, output terminals 43, 45 are provided on a left side surface of the battery module 300. The term "substantially parallel" here does not mean "parallel" in a strictly mathematical sense, but may include a difference of about 10° due to design conditions or variations in assembly. Moreover, adjacent first connection members 34, 34, 34 are not connected to each other via adjacent sections thereof. However, the first connection members 34, 34, 34 of the upper group are aligned in a line, the first connection members 34, 34, 34 of the lower group are aligned in a line, and the lines are parallel to each other. Note that the lines are not necessarily parallel in a strictly mathematical sense, but may include a difference of about 10° due to design conditions or variations in assembly.

Figure 5:
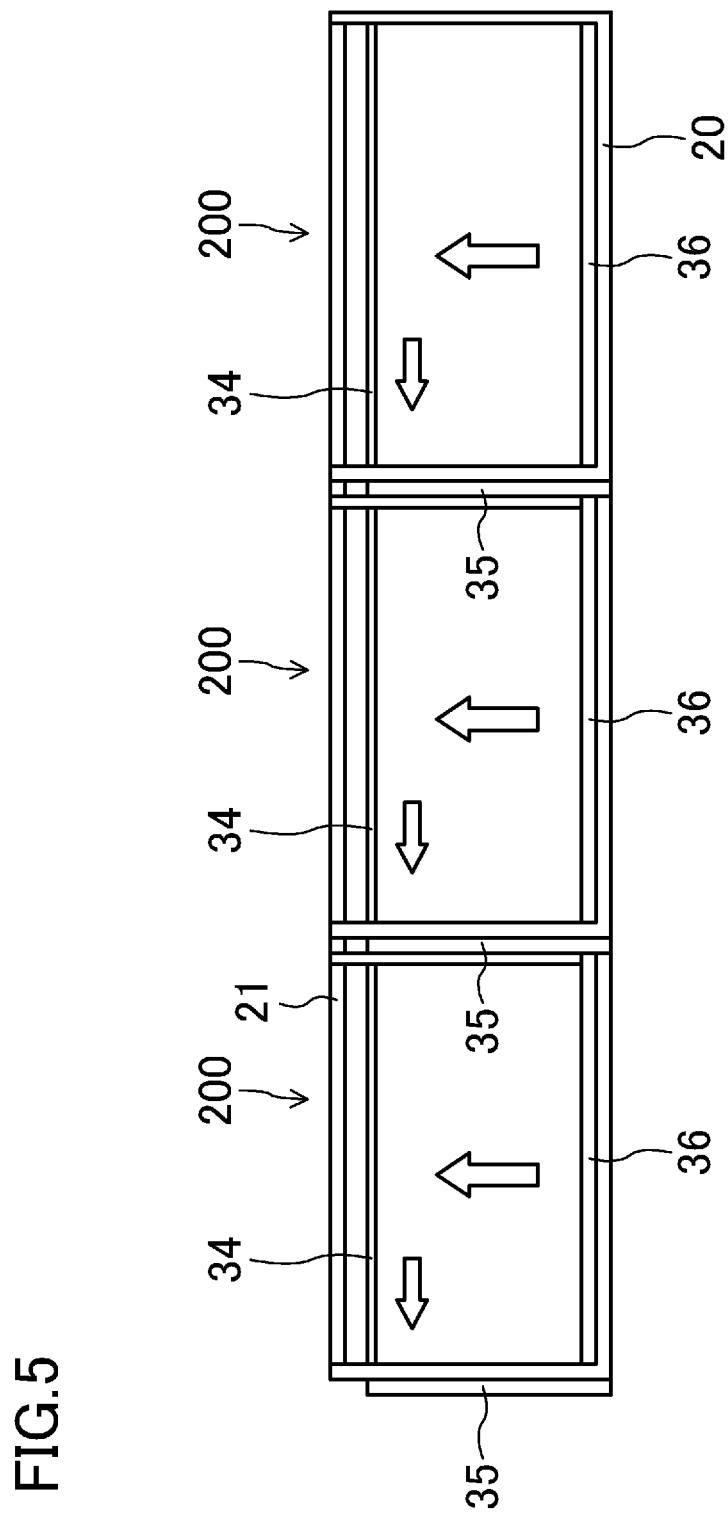
FIG. 5 is a view illustrating a flow of a current in the battery module.

In FIG. 5, a flow of a current in the battery module 300 is schematically illustrated. FIG. 5 is a view schematically illustrating three battery blocks 200, 200, 200 of the lower group of FIG. 3 without the lid. The current flows from the battery block 200 on the right to the left. The flow of the current is indicated by arrows. Specifically, a current flows from the second connection member 36 facing the negative electrodes in the rightmost battery block 200 (one of the two members) through the cells 100 to the first connection member 34 facing the positive electrodes. Then, the current flows from the first connection member 34 through the series connection member 35 arranged on the left of the rightmost battery block 200 from top to bottom. A lower end of the series connection member 35 is electrically connected to the second connection member 36 of the adjacent battery block 200 on the left of the series connection member 35. The current flows through the second connection member 36 of the battery block 200 arranged in the middle. Thereafter, the current flows likewise from the first connection member 34 through the series connection member 35 of the middle battery block 200, and further flows through the battery block 200 on a leftmost side.

As illustrated in FIG. 3, in the battery module 300, a current flows from a left end Y of the first connection members 34, 34, 34 of the upper group to the right, flows through the connection section 46, and then flows from a right end X of the first connection members 34, 34, 34 of the lower group to the left. Thus, the upper group and the lower group are opposite in direction of a current flowing through the first connection members 34, 34, 34. The first connection members 34, 34, 34 of the upper group and the first connection members 34, 34, 34 of the lower group form the parallel section, right ends of the first connection members on the rightmost side (ends of the two members) are connected to each other via the connection section 46, and the current conduction member including the parallel section and the connection section 46 has a U-shaped structure.

Figure 4:
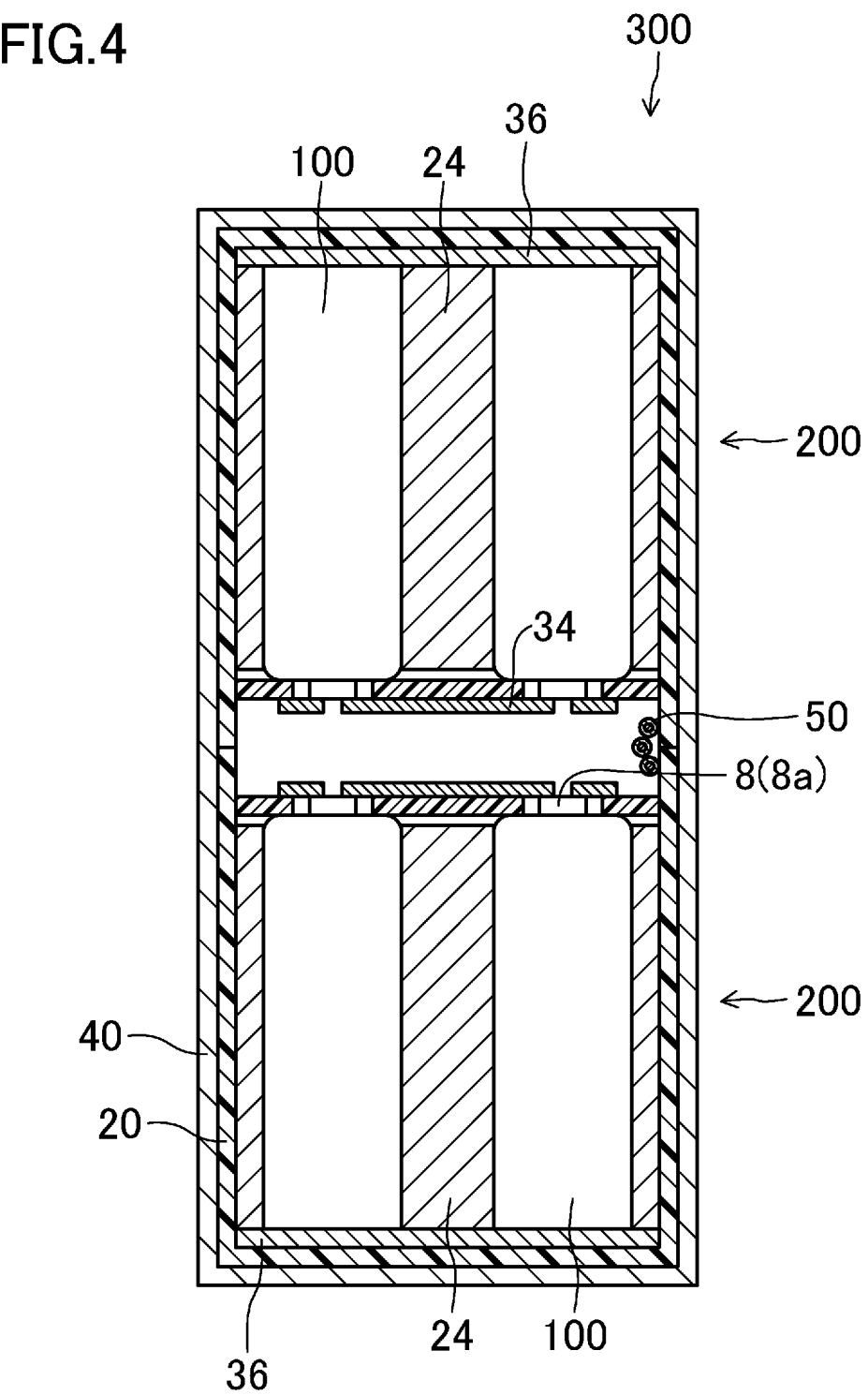
FIG. 4 is a cross-sectional view schematically illustrating the battery module taken along the line A-A of FIG. 3, where the battery module is covered with a lid.

FIG. 4 is a cross-sectional view schematically illustrating the battery module 300 taken along the line A-A of FIG. 3, where the battery module 300 is covered with a lid. Note that the cells 100 are not hatched.

Signal lines 50 extend from a left end of the battery module 300 (a left end of the parallel section) to approach the connection section 46 in the longitudinal direction, and are parallel to the first connection members 34, 34. In this case also, it is not required that the signal lines 50 are parallel to the first connection members 34, 34 in the strict sense. The signal lines 50 extend as a collective line 48 from the left end of the battery module 300 to the outside, and a connector 49 is attached to an end of the collective line 48. The connector 49 is connected to a control unit which is not shown. In FIG. 3, the signal lines 50 are hidden behind the container 20, and are not illustrated, but extend from a left end of the case 40 to approach the connection section 46. That is, the signal lines 50 do not reach the connection section 46. Ends of the signal lines 50 facing the connection section 46 are arranged in a position away from the connection section 46, and a direction away from the connection section 46 is a direction from the connection section 46 toward the left ends (the other ends) of the first connection members 34, 34, 34 included in the parallel section.

Through the signal lines 50, voltage signals of the battery blocks 200 are sent to the control unit. Thus, the voltages, the capacitance, etc. of the cells 100 are measured. Therefore, if there is a cell 100 which is in an abnormal state and has a voltage or capacitance different from that of the other cells 100, the cell 100 in the abnormal state can be located, and it is possible to notify a user or a responsible person of the battery module 300 of the occurrence of the abnormal state.

As illustrated in FIG. 4, the signal lines 50 are disposed nearly equidistant from and substantially parallel to the upper first connection member 34 and the lower first connection member 34. Note that the cross sectional view taken along the lien A-A illustrates the pair of battery blocks 200, 200 in the middle, but any pair of battery blocks 200, 200 has the same cross-sectional view. Here, the first connection member 34 is a plate-like member, and thus the distance between the first connection member 34 and the signal lines 50 is a distance between the center in a width direction of the first connection member 34 and the signal lines 50. A current flowing through the upper first connection member 34 and a current flowing through the lower first connection member 34 are at the same level, but flowing directions of the currents are opposite. Between the upper and lower first connection members 34, 34, magnetic fluxes cancel each other due to the currents in opposite directions so that high frequencies are reduced. This reduces noise on the signal lines 50 disposed nearly equidistant from the upper and lower first connection members 34, 34. Note that even when the signal lines 50 are not disposed equidistant from the upper first connection member 34 and the lower first connection member 34 in the strict sense, the noise on the signal lines 50 is reduced.

Moreover, the case 40 is made of metal, and is connected to ground, so that the case 40 serves as a shield, and protects the signal lines 50 from external noise. Moreover, between the adjacent members in the battery module 300, for example, between the case 40 and the container 20, between the container 20 and the cooling block 24, etc., portions illustrated to be intimately in contact with each other in FIGS. 2, 4 are formed to be intimately in contact with each other without a gap to ease entire temperature control. As described above, there is almost no gap in the battery module 300, and thus external noise hardly enters the battery module 300.

The signal lines 50 of the present embodiment are disposed between and equidistant from the upper and lower first connection members 34, 34 included in the parallel section serving as an output current line of the battery module 300 as described above, and thus noise is reduced. Moreover, the signal lines 50 extend only to approach the connection section 46, and thus the output current line does not cross the signal lines 50. Also in this aspect, the signal lines 50 are not influenced by the output current line. Moreover, the metal case 40 also serves as a shield, and thus the signal lines 50 are protected from noise in multiple ways.

(Second Embodiment)

Figure 6:
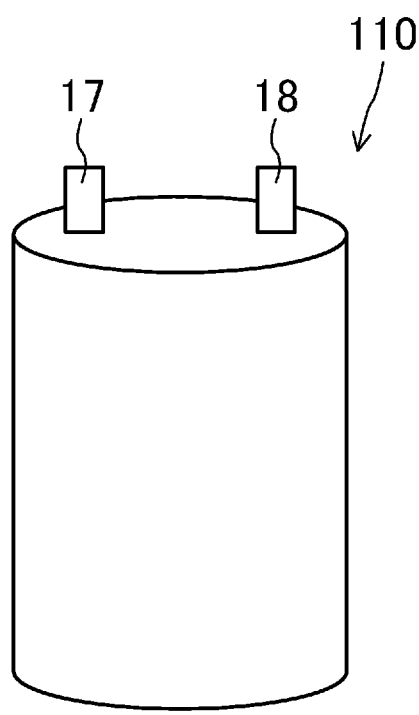
FIG. 6 is a view schematically illustrating a configuration of a cell used in a battery block of another embodiment.
Figure 7:
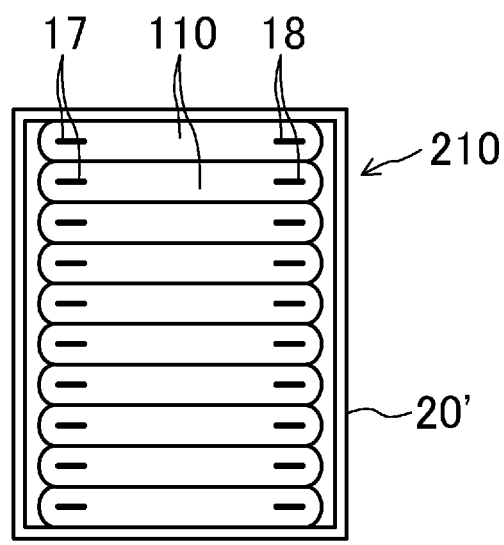
FIG. 7 is a view schematically illustrating a configuration of the battery block of the another embodiment.
Figure 8:
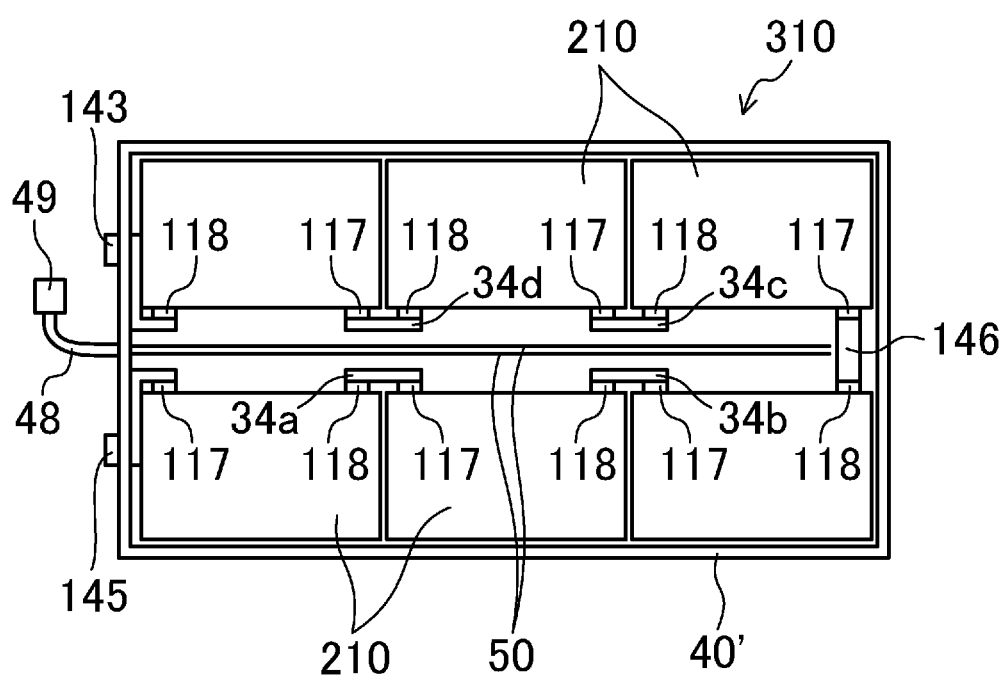
FIG. 8 is a view illustrating a configuration of a battery module of the another embodiment.

In a second embodiment, a so-called laminated secondary battery formed by hermetically sealing a wound electrode group and a nonaqueous electrolyte with a layered film illustrated in FIG. 6 is used as a cell 110, a battery block 210 of FIG. 7 includes multiple ones of the cell 110, and a battery module 310 of FIG. 8 includes multiple ones of the battery block 210. Each cell 110 has a structure in which a positive electrode terminal 18 and a negative electrode terminal 17 are leads made of metal thin pieces, and both the leads protrude from an upper surface of the cell 110. Ten such cells 110 are aligned and accommodated in a container 20' so that the positive electrode terminals 18 and the negative electrode terminals 17 protrude upwardly, thereby forming the battery block 210. In FIG. 7, a lid of the container 20' is omitted. In a state in which the container 20' is covered with the lid, the cells 110 in the container 20' are connected in parallel, and a positive electrode terminal section 118 and a negative electrode terminal section 117 are provided on the lid.

As illustrated in FIG. 8, the positive electrode terminal section 118 and the negative electrode terminal section 117 are provided to different ends of the battery block 210. In the battery module 310, two rows of battery blocks 210 are accommodated in a case 40', where the number of battery blocks 210 per row is three. The battery blocks 210, 210 in the row are aligned with their terminal sections having opposite polarities being adjacent to each other, and the terminal sections are electrically connected to each other via connection members 34a, 34b, 34c, 34d. Moreover, ends on one side of the rows are connected to each other via a connection section 146, and the ends on the other side of the rows are connected to output terminals 143, 145.

In the battery module 310, the connection members 34a and 34d in the two rows are parallel to each other and are arranged to face each other, and the connection members 34b and 34c in the two rows are parallel to each other and are arranged to face each other. The connection members 34a and 34d facing each other are opposite in direction of a current flowing therethrough, and the connection members 34b and 34c facing each other are opposite in direction of a current flowing therethrough. Signal lines 50, 50 are disposed nearly equidistant both from the connection members 34a and 34d facing each other and from the connection members 34b and 34c facing each other. Thus, magnetic fields generated by currents flowing through the connection member 34a and 34d, and the connection members 34b and 34c cancel each other, so that superimposition of noise on electric signals sent through the signal lines 50, 50 is significantly reduced.

(Other Embodiments)

The embodiments described above are examples of the present invention, and are not intended to limit the present invention. The cell may be any type, and may have any structure and any shape as long as the cell is a secondary battery. The number of signal lines may be changed. The configuration and structure of the battery block are not limited to the above description. In the battery module, the number and arrangement of the battery blocks may be changed, or a temperature control member or other members may be installed in the battery module. The signal line may include a line for sending a signal representing the temperature in the battery module to the control unit. Alternatively, the signal line may include a line for sending a command signal from the control unit to the battery module. The signal line may be arranged in any positions as long as the signal line is disposed equidistant from the upper and lower first connection members.

INDUSTRIAL APPLICABILITY

As described above, the battery module according to the present invention has a structure in which noise is not superimposed on the signal line, and is useful as power supplies for mechanical products such as vehicles, household power supplies, or the like.

DESCRIPTION OF REFERENCE CHARACTERS

1 Negative Electrode
2 Positive Electrode
4 Electrode Group
7 Cell Case (Negative Electrode Terminal)
8 Terminal Plate (Positive Electrode Terminal)
17 Negative Electrode Terminal
18 Positive Electrode Terminal
34 First Connection Member
34a Connection Member
34b Connection Member
34c Connection Member
34d Connection Member
36 Second Connection Member
40 Case
40' Case
46 Connection Section 50 Signal Line
100 Cell
110 Cell
146 Connection Section
200 Battery Block
210 Battery Block
300 Battery Module
310 Battery Module

The invention claimed is:

1. A battery module comprising:
a plurality of cells;
a plurality of battery blocks each including at least two of the plurality of cells accommodated in a container, the battery module including the plurality of battery blocks housed in a case,
a connection member made of a metal plate electrically connecting electrode terminals of the same polarity of the plurality of cells in the respective battery blocks; and
a signal line, wherein
the plurality of battery blocks are arranged in a pair to face each other, in each pair of battery blocks, the electrode terminals of the same polarity of respective cells of the battery blocks are arranged to face one another,
the connection members of the pair of battery blocks serve as a parallel section in which the connection members are opposite in direction of a current flowing therethrough, and are arranged substantially parallel to each other, and the pair of battery blocks are electrically connected to each other at one end of the parallel section by a connection section,
the signal line is arranged nearly equidistant from the connection members while being interposed in a space between the respective connection members of the pair of the battery blocks, and is arranged substantially parallel to the connection members,
one end of the signal line is arranged in a position away from the connection section in a direction toward the other end of the parallel section, and
the space forming a duct for exhausting a gas emitted from the plurality of cells of each pair of battery blocks.

2. The battery module of claim 1, wherein
the connection members forming the parallel section consist of 2n pieces, n being an integer greater than or equal to 1, which are opposite in direction of a current flowing therethrough, and are arranged substantially parallel to each other,
the signal line is arranged nearly equidistant from the 2n pieces which are arranged in pairs to be substantially parallel to each other and to face each other, and
the signal line extends substantially parallel to the 2n pieces arranged in pairs.

3. A battery module including a plurality of cells which are columnar secondary batteries, and are accommodated in a metal case, the battery module comprising:
a plurality of battery blocks connected to each other in series, wherein
a first electrode terminal and a second electrode terminal are arranged respectively on an upper surface and a lower surface of each of the columnar cells,
the battery blocks each include at least two of the plurality of cells connected to each other in parallel, where the cells are aligned with side surfaces of the cells being adjacent to each other to align the upper surfaces on a same side, and the battery blocks adjacent to each other are connected via a series connection member,
the battery blocks each include a first connection member which is made of a metal plate and arranged to face the upper surfaces of the cells to electrically connect the first electrode terminals to each other, and a second connection member which is made of a metal plate and arranged to face the lower surfaces of the cells to electrically connect the second electrode terminals to each other,
the plurality of battery blocks are grouped into two groups in each of which the battery blocks are arranged with the first connection members being aligned in a line,
the groups are arranged to face each other, and are electrically connected to each other at ends of the two groups via a connection section on one side, in each group of battery blocks, the electrode terminals of the same polarity of respective cells of the groups are arranged to face one another,
a signal line is arranged nearly equidistant from the first connection members while being interposed in a space formed between the first connection members of the battery blocks of the two groups facing each other,
one end of the signal line is arranged at a position away from the connection section in a direction toward ends of the first connection members on the other side,
the space forming a duct for exhausting a gas emitted from the plurality of cells of each pair of battery blocks.

* * * * *